United States Patent [19]

Baumeister et al.

[11] Patent Number: 4,496,426

[45] Date of Patent: Jan. 29, 1985

[54] PROCESS FOR THE CONTINUOUS EXTRACTION OF VEGETABLE-FIBER MATERIAL IN TWO STAGES

[75] Inventors: Manfred Baumeister, Gröbenzell; Eugen Edel, Munich, both of Fed. Rep. of Germany

[73] Assignee: MD-Verwaltungesellschaft Nicolaus GmbH & Co. KG, Munich, Fed. Rep. of Germany

[21] Appl. No.: 482,462

[22] Filed: Apr. 6, 1983

[30] Foreign Application Priority Data

Apr. 6, 1982 [DE] Fed. Rep. of Germany ....... 3212767

[51] Int. Cl.³ .......................... D21C 3/02; D21C 3/20
[52] U.S. Cl. ....................................... 162/19; 162/29; 162/72; 162/77; 162/90
[58] Field of Search ........................ 162/17, 72, 90, 77, 162/71, 19, 60, 29, 30.1, 16

[56] References Cited

U.S. PATENT DOCUMENTS 2,166,540 7/1939 Bailey ..................................... 162/71
4,012,280 3/1977 Holton .................................. 162/72

FOREIGN PATENT DOCUMENTS 1111694 3/1981 Canada .................................. 162/77
51-7204 1/1976 Japan ..................................... 162/77
WO82/01568 5/1982 PCT Int'l Appl. .................... 162/77

OTHER PUBLICATIONS

Green et al., "Alkaline Pulping In Aqueous Alcohols and Amines", Tappi, May 1982, vol. 65, No. 5, pp. 133–137.

Primary Examiner—Steve Alvo
Attorney, Agent, or Firm—Schwartz, Jeffery, Schwaab, Mack, Blumenthal & Koch

[57] ABSTRACT

This invention relates generally to the extraction process and provides a novel process and reactor for the continuous extraction of vegetable-fibre material such as wood chips. The process comprises a two stage process, the first stage comprising an extraction process using a methanol:water mixture and the second stage using the same extraction liquid as the first with a greater proportion of water, with sodium hydroxide and anthraquinone. A part of the extraction liquid which is saturated by extraction substances is continually carried away at each stage and after extraction, the mixture is subjected to washing. This process has eliminated the heavy pollution produced by the prior art processes and also has reduced the cost and complexity of the prior art processes.

13 Claims, 2 Drawing Figures

PROCESS FOR THE CONTINUOUS EXTRACTION OF VEGETABLE-FIBER MATERIAL IN TWO STAGES

BACKGROUND OF THE INVENTION

This invention relates generally to the extraction process and more particularly, to a process and a reactor for the continuous extraction of vegetable-fibre material such as wood chips. The process comprises treating the material with organic solvents at elevated temperatures. The vegetable-fibre material is first impregnated with organic solvents in an impregnating device and then passed to a reactor.

In the past, the sulphate process or the sulphite process were used to produce cellulose which was processed further into paper. One of the most important disadvantages of these processes was the resultant heavy pollution caused by the thus produced waste water and waste-gases, especially from the standpoint of sulphur-content.

More recently, as a result of this disadvantage, various processes for continuous extraction of vegetable-fibre material have been developed, in which no sulphur-containing compounds are used. In addition, other compounds contained in the vegetable fibres, may also be recovered in addition to cellulose. Such other compounds include, for example, lignin and hemicellulose. Such a process is described in German Offenlegungsschrift No. 28 55 052. These processes have been very complicated and expensive.

SUMMARY OF THE INVENTION

Accordingly, it is an object of the present invention to at least partially overcome these disadvantages by providing a process and an apparatus for the continuous extraction of vegetable-fibre material, using organic solvents, which process being simple in operation and causing no pollution. With the present process and apparatus, the essential constituents of the vegetable-fibre material such as cellulose, hemicellulose and lignin may all be recovered in pure form.

To this end, in one of its aspects, the invention provides a process for the continuous extraction of vegetable-fibre material by the treatment of said material with organic solvents at elevated temperatures and pressures, wherein said material is impregnated with said organic solvents in an impregnating unit and then passed to a reactor, characterized in that the process carried out in the reactor is carried out in two stages the first stage comprising an extraction process using a mixture of about 90:10 by weight of methanol and water with a digesting period of from about 40 minutes to about 120 minutes, at a temperature of from about 180° C. to about 210° C. and at a pH of about 3.8 to about 4.9, and said second stage comprising a second extraction stage using the same extraction liquid as per said first stage as set forth hereinbefore, except with a greater portion of water, a digesting period of from about 10 minutes to about 80 minutes, at a temperature of from about 150° C. to about 190° C., with the addition of an aqueous sodium hydroxide solution in an amount of from about 5% to about 30% by weight of sodium hydroxide to dry wood, and between about 0.01% and about 0.15% by weight of anthraquinone to dry wood; and a part of said extraction liquid which is saturated by extraction substances, is carried away continuously at each stage, and after extraction, said material is subjecting to washing.

BRIEF DESCRIPTION OF THE DRAWINGS

Further objects and advantages of the invention will appear from the following description taken together with the accompanying drawings in which.

DETAILED DESCRIPTION OF PREFERRED EMBODIMENTS

Figure 1:
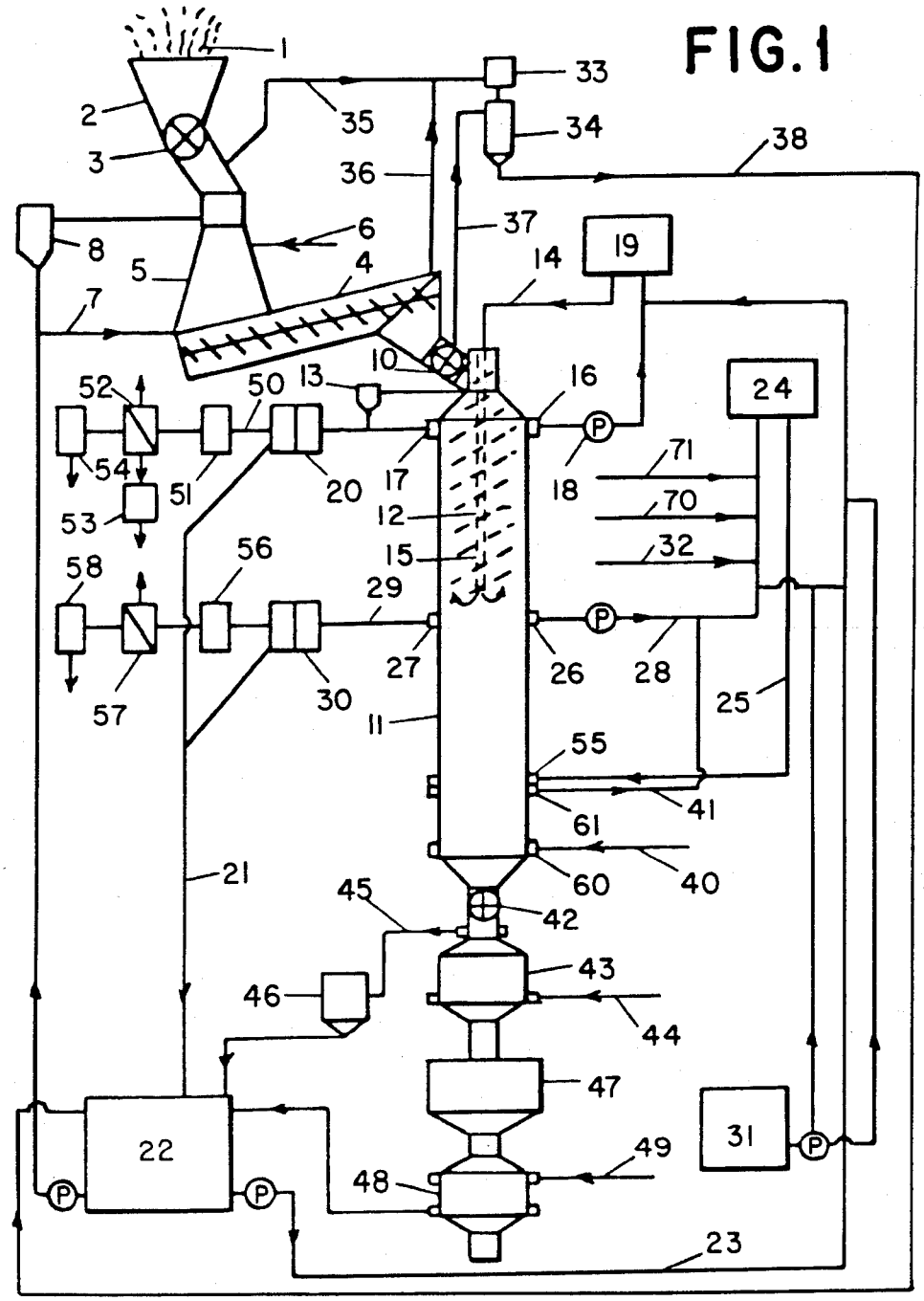
FIG. 1 is a diagrammatic representation of the process of the present invention.

The process of the present invention is preferably carried out in a reactor in two stages. The first stage consists of extraction with a mixture of methanol and water (about a 90:10 mixture), using about 65% to about 45% by weight of the mixture. The material is digested for a period of time from about 40 minutes to about 120 minutes, preferably from about 50 minutes to about 70 minutes, at a temperature of from about 180° C. to about 210° C., preferably from about 195° C. to about 205° C., and a pH of from about 3.8 to about 4.9, preferably from about 4.0 to about 4.5.

The fibre material is then passed to the second stage which consists of a further extraction. The same extraction liquid is used although the amount of water in the mixture is increased. The ratio of liquid to material is about the same as in the first stage and the digestion period is from about 10 minutes to about 80 minutes at a temperature of from about 150° C. to about 190° C., preferably from about 160° C. to about 175° C. An aqueous sodium hydroxide solution is added in an amount of from about 5% to 30% by weight, preferably 20% to 25% by weight, of the sodium hydroxide vis-a-vis absolutely dry wood. Anthraquinone is also added in an amount of between 0.01% and 0.18% by weight, preferably about 0.08%, vis-a-vis absolutely dry wood. The process is also characterized in that a part of the extraction liquid which is saturated with extraction substances, is removed continuously from each stage of the process. After extraction, the vegetable-fibre material is subjected to washing.

It has been found that the new process produces particularly good results. The vegetable-fibre material moves in counterflow to the extraction liquid and in relation thereto, the extraction liquid is used in amounts of about 3 to about 20, preferably from about 7 to about 10 times the volume of absolutely dry wood. The pressure in the reaction container is in excess of 10 bars, preferably between about 12 to about 40 bars.

It is preferable to subject the fibre material to two washings after extraction, both with water. For the first washing, the incoming water should be at a temperature of from about 40° C. to about 50° C., in which case, the temperature of the material will be between about 110° C. and 130° C. The preferred temperature of the material is about 120° C. The washing operations should also proceed in counterflow as do the extraction operations. In one embodiment, the first washing operation proceeds in counterflow and the second washing operation proceeds in the same flow direction as the material. In this case, the first washing operation will take place at the lower end of the reactor and the second washing operation will take place after the material has left the reactor, just before the cellulose is bleached. A stripping operation may be carried out between the washing operations for solvent recovery and preferably, this stripping operation is carried out externally to the reactor.

Good results may also be obtained with a washing operation being done immediately subsequent to the first stage. In this case, the washing agent used is the extraction agent from the first stage and is used in the same proportions. The temperature of this washing agent is between about 160° C. and about 140° C. This procedure produces a definite separation between the individual extraction stages as the temperature in the washing zone is itself between about 170° C. and about 175° C.

The extraction liquids for the individual extraction stages have their own circuits, which largely avoids consumption of the solvents. Each circuit has a heat-exchanger for adjusting the temperature of the extraction agent and a device adapted to add the extraction agent whereby the desired ooncentration of the mixture of extraction agents can be held constant. The volume of the mixture of extraction agents which is added to the circuits in the individual stages ranges from about 10% to about 60%, and preferably, about 30% and this corresponds to the amount of extraction agent removed with the saturated extraction liquid.

The extraction liquid is removed from each extraction stage for separation of the extraction substances. These substances are then subjected to distillation. The resultant extraction agent, that is a mixture of methanol and water, is passed to a collecting tank and then back to the extraction agent circuit.

The separated extraction liquid which is charged with extraction substances from the first stage, is then passed to a bath for precipitating the lignin which is then separated by a filter and subjected to drying. Then, the lignin is ready for further use. The sugar solution which is left behind after the separation of the lignin is then subjected to hydrolysis followed by sugar utilization or to hyperfiltration.

The extraction liquid which is removed from the second extraction stage is separated by distillation. The liquid, which is charged with extraction substances, is subjected to neutralization followed by filtration and drying of the lignin. The filtration residues are evaporated and the salt can then be utilized.

The impregnation which precedes the extraction stages is carried out using a method such as that disclosed in German OS No. 28 55 052, at a temperature of between about 40° C. and 80° C., preferably at about 60° C. The impregnating unit is also provided with a cyclone separator for condensing the solvent vapours.

The reactor used to carry out this novel process, consists essentially of two reaction containers arranged in series. Each container is provided with an extraction agent circuit with each circuit having its own heat-exchanger for heating the extraction agent.

Referring now to FIG. 1, wood chips 1 are charged into hopper 2 and are metered by a vane-wheel 3 into a container 5 which is located above the impregnating worm 4. The wood chips 1 are then heated to a temperature of from about 70° C. to about 80° C. in container 5 which acts as a steam chamber. The heating is accomplished by low pressure steam which is injected through line 6 into the container 5.

A mixture of solvent and water is then passed to the impregnating worm 4 through line 7. This mixture is in a preferred embodiment, a mixture of methanol and water and is at a temperature of about 60° C. Levelling vessel 8 regulates the level of the mixture.

The difference in temperature between the heated wood chips and the cooler, impregnating liquid, results in an abrupt condensation of vapours in the pores of the wood. This produces a negative pressure in the pores which results in the drawing into the pores of the impregnating liquid. The excellent wetting ability of the alcohol, in conjunction with its ability to dissolve terpene and resins, combined with the low viscosity of the impregnating liquid, greatly facilitates the penetration of the liquid into the pores of the wood chips. As a result, the impregnation operation takes only a very short period of time, that is, only a few minutes. The amount of time that the wood chips remain in the impregnating worm is between about 10 minutes and 60 minutes, and preferably from about 20 minutes to about 40 minutes.

The impregnated wood chips 1 are then metered by the variable speed worm 4 through a pressure lock 10 (also referred to as the feed system) into the reactor 11. A downwardly directed worm 12 in the reactor 11 feeds the wood chips below the level of the liquid in the reactor 11 which is held constant by levelling vessel 13.

The upper part of the reactor constitutes the first extraction stage where the initial digestion of the wood chips 1 takes place. To this end, the extraction liquid is passed to the reactor 11 through line 14 and the hollow shaft 15 of the worm 12 which urges the wood chips downwardly. As seen by the arrows in FIG. 1, the extraction liquid emerges from the lower end of the shaft 15 and then flows upwardly for removal from the reactor at points 16, 17. Most of the extraction liquid which is removed at 16 is delivered via pump 18 to the heat-exchanger 19 wherein the heating of the extraction agent occurs. The extraction agent is then returned to the reactor 11 through line 14 and the circuit of the first extraction stage is closed. A lesser amount of the extraction liquid which is saturated with the extraction substance, is removed at 17 and is then passed to an expansion and cooling vessel 20. The expansion and cooling separates out the substances such as lignin and hemicellulose from the extraction agent and the latter is moved through line 21 to the solvent tank 22. Any loss of the extraction agent which may occur in the circuit in the first stage is then replaced from tank 22 through line 23. The extraction substances which were separated out by expansion and cooling, which are still fluid, are then passed through line 20 to a bath 51 in which the lignin is precipitated into water. The lignin is then separated through filter 52 and then dried. The remaining sugar solution is subjected either to after-hydrolysis 53 or to hyperfiltration 54 before further commercial processing.

The first stage is followed by a second stage wherein the extraction liquid also moves in counterflow to the flow of the wood-chips and in a circuit. The extraction liquid is heated in a heat-exchanger 24 from where it is fed through line 25 into reactor 11 at point 55. The extraction agent flows from the bottom to the top in reactor 11 and is then divided and removed from the reactor at points 26, 27. Here again, as in the first stage, most of the extraction agent passes through line 28 back to the heat-exchanger 24 while a lesser amount is fed as saturation extraction liquid, through line 29 to an expansion and cooling unit 30. The extraction liquid removed at point 27 is replaced from solvent tank 22 through line 23. Since in the second stage, it is preferable to use an extraction agent containing a larger proportion of water, water may be fed in through line 32. As in the corresponding location in the first stage, the extraction agent is separated during distillation in unit 30, from the extraction substances and is passed to the solvent tank 22.

The separated extraction substances, on the other hand, are neutralized with an appropriate acid in container 56. After neutralizing, filtration is carried out in order to separate the lignin, which after drying, is suitable for further use. The filtration residues are evaporated and the salts are reconditioned. The sodium hydroxide solution is added through line 70 and the anthraquinone is metered in through line 71.

The second stage of the process follows immediately after the first stage. An interface is produced between the two stages by a temperature differential of about 5° C. to about 10° C. between the extraction liquids. As a result, the extraction liquid in the first stage is deflected upwardly.

The extraction of the second stage is followed by washing with water. Water is introduced into the reactor 11 at point 60 through line 40 and is removed at point 61 through line 41. The water is first heated and then fed into the reactor 11 at a temperature of about 45° C. As a result, the wood chips are cooled down to a temperature of about 120° C. The wash water passes through line 41 to the circulation of the second extraction stage in front of the heat-exchanger 24.

The digested wood chips are gated out at the bottom of the reactor through a pressure lock 42 and then passed to a stripping tank 43 where they are treated with steam in order to recover the solvent. The steam is injected into tank 43 through line 44 and it exits, charged with the extraction agent through line 45. It is passed then to the cooler 46 and then as a mixture of extraction agent and water, to tank 22. The cellulose is collected in container 47 after which it is passed to a second washing stage in container 48 which is located immediately before the cellulose bleaching operation.

The wash water passes through line 49 to container 48 and is then removed through line 59 to be fed to the solvent tank 22. Within the container 48, the wash water and the cellulose move in the same flow direction which assists in the discharge of the cellulose from the container.

Any vapours which may arise during the impregnation with the worm 4 and during the expansion in pressure lock 10, are precipitated in cooler 33 and cyclone 34 and are then passed to the vessels through lines 35, 36 and 37. The resultant mixture of solvent and water is passed through line 38 to tank 22 to effect a further return of solvent to the system.

With respect to the use of the solvent, this is a closed system. At all the locations in the system where the solvent is removed, precautions are taken to allow a return of the solvent and the extraction agent to the system itself. The small amount of solvent which is unavoidably consumed in spite of all precautions, is replaced from solvent tank 31 by metering pumps which are used to feed the appropriate amounts to the individual circuits in the extraction stages.

The two stage process of the present invention takes into account, the fact that the extraction circuit, the delignification circuit and the cellulose decomposition circuit all run in opposite directions. In the first stage, prehydrolysis is carried out at elevated temperatures and at a slightly acid pH value. The further extraction is carried out in the second stage under slightly alkaline conditions. This method makes it possible to treat the cellulose rather gently while reducing the residual lignin content to a small percentage.

Figure 2:
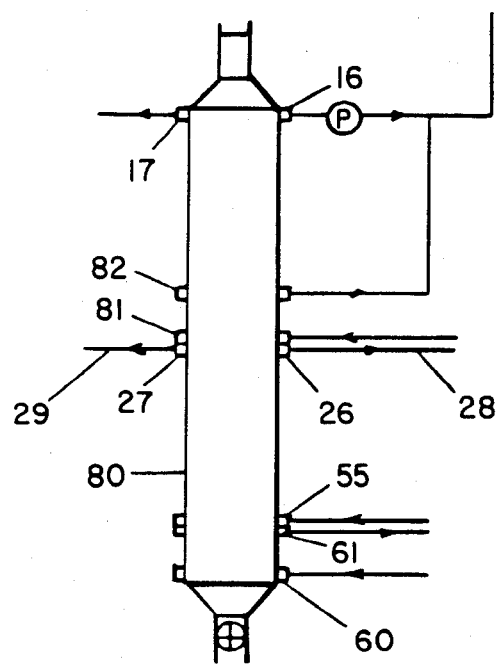
FIG. 2 is a diagrammatic representation of a reactor with intermediate washing.

This extremely gentle treatment of the cellulose may be assisted still further by an intermediate washing operation. A reactor 80 including means for an intermediate washing operation is illustrated in FIG. 2.

This reactor comprises after the first stage, two additional annular lines 81, 82 through which an appropriate washing fluid may be introduced and removed again. The washing fluid used is a liquid having the same composition as the first stage extraction agent but at a temperature of from about 120° C. to about 150° C. The washing liquid is removed from a suitable point in the circuit of the first extraction stage and then cooled to a suitable temperature after which it is passed to the reactor. After the washing operation, the liquid is returned to the circuit. All of the other parts of the reactor 80 of FIG. 2 are the same as the corresponding parts of the reactor 11 of FIG. 1.

EXAMPLE 1

Using the installation as shown in FIG. 1, the following values were obtained during an extraction.

The reactor was first filled with spruce chips with a 73% solids content after which additional chips were introduced continuously at a rate of 8 kh/h into the steam chamber through the vase-wheel.

The chips were then impregnated and passed to the first extraction stage of the reactor through the feed system. The chips were then passed to the second extraction stage, washed in the washing zone and then finally discharged as cellulose by the discharge system.

As a result of the reactor volume ratios, the 8 kh/h rate produced a period of residual of 20 minutes in the impregnating unit, 70 minutes in the first extraction stage, 60 minutes in the second extraction stage and 20 minutes in the washing zone.

A methanol-water mixture containing 53% by weight of methanol, was used for impregnating and as the extraction liquid in the first extraction stage. The amount of freshly added extraction liquid was 28 kg/h corresponding to a liquid-to-solid ratio of 1:3.5 with respect to the wood used. For impregnating the wood chips, the temperature in the steam chamber was about 80° C. and in the impregnating unit, about 70° C. The heat-exchanger raised the temperature of the extraction liquid of the first stage to about 205° C.

The extraction liquid used in the second stage was a mixture of methanol and water and contained 38% by weight of methanol and was used at a temperature of about 170° C.

The methanol concentration in both extraction stages was constantly monitored and corrected. Part of the mixture of methanol and water was obtained from the counterflow washing operation in the washing zones and was then adjusted to the desired 38% by weight using 80% methanol (at a rate of about 26 l/h) 35 g of NaOH and 12 g of anthraquinone per kg of second stage extraction liquid were added as catalysts. These amounts of catalysts corresponded to 25% by weight and 15% by weight, respectively, in relation to the freshly introduced wood and corresponding to the amount of 56 kg/h of extraction liquid as described hereinbefore. The liquid-to-solids ratio thus amount to 1:7 in relation to freshly added wood.

Water was added in the washing zone at about 30 kg/h. It was preheated to about 70° C. thus bringing the average temperature of the washing zone to about 115° C. 2.4 kg/h of absolutely dry cellulose was obtained at the outlet which corresponds to a yield of 41% of the continuously introduced absolutely dry wood. The cellulose was then rewashed and bleached.

The following values were obtained for the cellulose.

TABLE 1

| Value | Amount |
|---|---|
| 1. Residual lignin (Runkel) after 1st stage: | 10.7% (lignin in initial wood: 28%) |
| 2. Residual lignin (Runkel) after second stage extraction and washing: | 3.0% |
| 3. Kappa number | 15 |
| 4. Viscosity (Tappi 230sm-50 1%) | 115 |
| 5. α-cellulose content (17.5% NaOH) | 91.5 |
| 6. Breaking length | 27°SR 6070 m |
| | 81°SR 8790 m |
| 7. Tear Propagation Strength | 27°SR 1600 ml/m |
| | 81°SR 1140 ml/m |

Although the disclosure describes and illustrates a preferred embodiment of the invention, it is to be understood the invention is not restricted to this particular embodiment.

The embodiments of the invention in which an exclusive property or privilege is claimed are defined as follows:

1. A process for the continuous extraction of fibrous vegetable material comprising the steps of:
   (a) impregnating an amount of fibrous vegetable matter with an organic solvent solution; then
   (b) in a first extraction stage, digesting said fibrous vegetable material in a first extraction liquid comprising a mixture of methanol and water in a ratio of about 90:10 for a period of about 40 to about 120 minutes at a temperature of about 180° C. to about 210° C. and a pH of between about 3.8 to about 4.9; thereafter,
   (c) in a separate second extraction stage, further digesting said fibrous material in a second extraction liquid for a period of about 10 to about 80 minutes at a temperature of about 150° C. to about 190° C., said second extraction liquid comprising:
      (i) said first extraction liquid from step (b);
      (ii) an additional amount of water;
      (iii) an aqueous sodium hydroxide solution in an amount of from about 5% to about 30% by weight of sodium hydroxide to dry wood; and
      (iv) between about 0.01% and about 0.15% by weight of anthraquinone to dry wood.

2. A process as claimed in claim 1, wherein said fibrous vegetable material comprises wood chips.

3. A process as claimed in claim 1, wherein said mixture of methanol and water used in said first extraction stage comprises from about 45% to about 65% by weight.

4. A process as claimed in claim 1, wherein said digesting of said first extraction stage is for a period of from about 50 minutes to about 70 minutes.

5. A process as claimed in claim 1, wherein said temperature of said first extraction stage is from about 195° C. to about 205° C.

6. A process as claimed in claim 1, wherein said pH of said first extraction stage is from about 4.0 to about 4.5.

7. A process as claimed in claim 1, wherein said temperature of said second extraction stage is from about 160° C. to about 175° C.

8. A process as claimed in claim 1, wherein the amount of said sodium hydroxide solution is between about 20% to about 25% by weight of sodium hydroxide to dry wood.

9. A process as claimed in claim 1, wherein said anthraquinone is present in the amount of about 0.08% by weight of anthraquinone to dry wood.

10. A process as claimed in claim 1, further comprising a step which comprises:
    (a) continuously removing, during at least one of said first and second extraction stages, a predetermined amount of at least one of said first extraction liquid and said second extraction liquid, respectively;
    (b) distilling said predetermined amount of extraction liquid; and
    (c) reusing the product of said distilling in said process.

11. A process as claimed in claim 1, further comprising immediately prior to step (b) a step of washing said fibrous vegetable matter at a temperature between about 140° C. and about 160° C. in a liquid comprising methanol and water in a ratio of about 90:10.

12. A process as claimed in claim 1, further comprising after step (c) a washing step which comprises washing said fibrous vegetable matter.

13. A process as claimed in claim 12, wherein said washing step comprises two separate washings of said fibrous vegetable material, both of said separate washings being with water.

* * * * *